UNITED STATES PATENT OFFICE.

JOHN ABSTERDAM, OF NEW YORK, N. Y.

CAR-WHEEL.

SPECIFICATION forming part of Letters Patent No. 236,525, dated January 11, 1881.

Application filed May 13, 1880. (No model.)

*To all whom it may concern:*

Be it known that I, JOHN ABSTERDAM, a citizen of the United States, residing at New York, in the county and State of New York, have invented a new and useful Improvement in Car-Wheels, of which the following is a specification.

My invention consists in constructing a steel-tired wheel with a detachable tire provided with an inner annular flange or web at the opposite end of the regular flange of the wheel, and an annular metallic flange secured between the steel tire and in the inner surface of a flange formed by one side of the wheel, so that when the annular flange wears off before the tire wears off the flange can be replaced by another without disturbing the remaining portion of the wheel, or without interfering with the life of the wheel proper, so that the same wheel may be continually used by simply replacing the worn-out part, either by a new flange or tire, or both, according to whichever may be worn out first.

It also consists in the particular mode of forming an annular wood filling for the central part of the wheel.

This invention is illustrated in the accompanying drawings, in which Figure 1 represents a central section. Fig. 2 is a face view, partly in section. Fig. 3 is a central section of a modification.

Similar letters indicate corresponding parts.

In the drawings, the letter A designates a car-wheel, which may be of any suitable form. The wheel shown in Figs. 1 and 2 is composed of a hub, *a*, which is, by preference, made of cast-iron, and provided with two shoulders, *b c*. On each end of this hub is slipped a ring-plate, *d e*, by preference made of wrought-iron, and these plates are firmly fastened to the hub by rivets or bolts *f*. The annular space between the plates *d e* is filled up with a solid body of wood, *g*, and the plate *d* extends up beyond the circumference of the plate *e* and of the wood filling *g*, so as to form the flange *h*. The inner surface of this flange is protected from wearing against the rails by an annular flange, *i*, of steel or other equivalent material, which is made of the proper thickness and length, the inner circumference resting on the periphery of the wood filling *g*, and is fastened into the inner surface of the flange *h* by rivets or screws *j*. On the inner edge of this flange is formed a small flange, *k*, projecting at right angles from the flange *i*, which is let in flush with the circumference of the wood filling *g*. The tire *l* is made of steel or other equivalent material, and it is provided with an inner annular flange or web, *m*, which bears against the outer surface of the ring-plate *e*, while the opposite side of this tire *l* bears firmly against the annular flange *i* and the heads of the screws *j*, while the inner circumference of this tire bears firmly upon the periphery of the wood filling *g*, and on the small flange *k* of the annular flange *i*. The tire *l*, the ring-plates *d e*, and the wood filling are fastened together by rivets or bolts *n*.

It will be seen from this description that in my wheel, as illustrated in the drawings, the flange *i* is not only held in position by the screws *n*, screwed or riveted into the flange *h*, but is firmly held in its place, clasped between the inner side of the tire *l* and flange *h*, by tightening the bolts or rivets *n*, and those parts of this wheel which are chiefly liable to wear—viz., the tire and the annular flange *i*—are made of steel, while the remaining parts of the wheel are made of a cheaper material, and when either the annular flange or the tire wears off first these parts can be readily replaced without disturbing the remaining parts.

As the tire can be made of any desired thickness, while the flange is generally limited to about one and one-fourth inch in order to pass through the frogs, it is evident that the flange is liable to wear off in curving before the tire is worn out.

The ring-plate *d* may be made to project out about even with the periphery of the tire *l*, and said tire may be made all of one piece with the flange *i*, when desired to do so.

In order that my invention may be practically carried out by those skilled in the art to make and use the same, I will here describe the mode of forming the wooden filling *g*.

I take wood, saw it into veneers, cut these veneers into segments of the length required, and boil them in water to extract the resinous gum contained in the wood. A suitable quantity of borax or some alkali may be added to the water to aid in dissolving such sap or (No Model.)
A. L. ADAMS.
Combined Anvil and Vise.
No. 236,526. Patented Jan. 11, 1881.
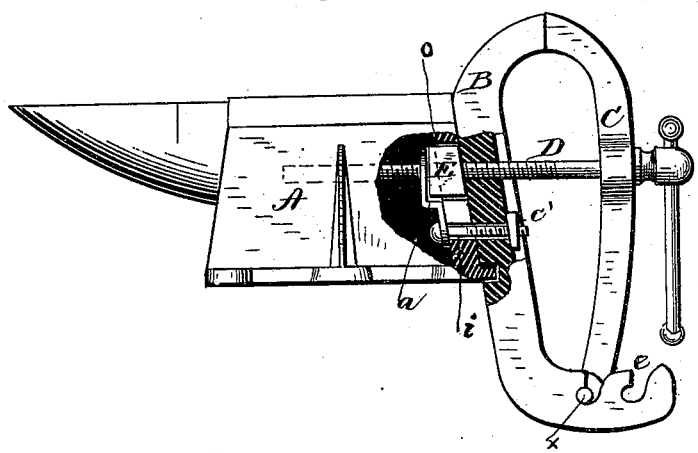
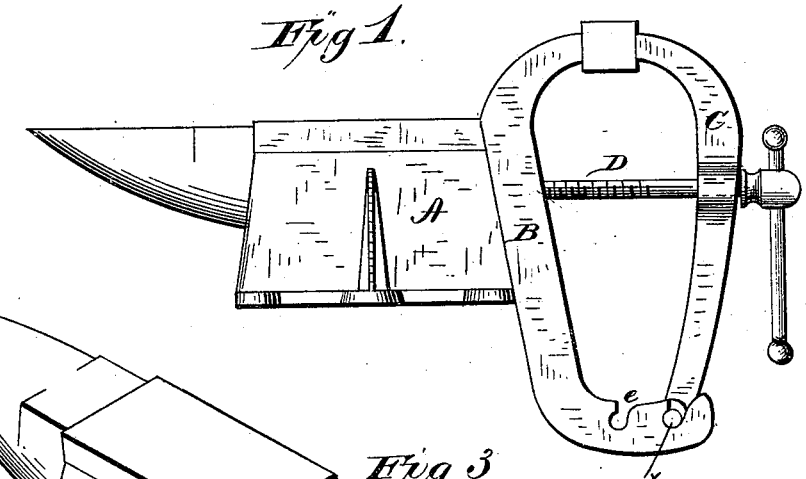
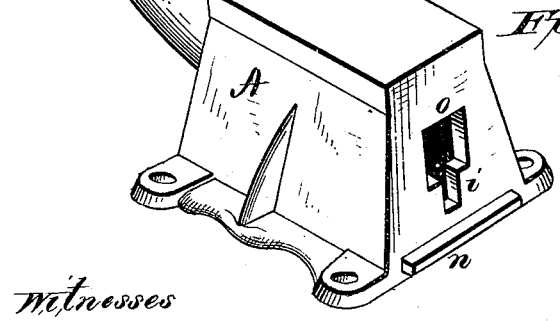
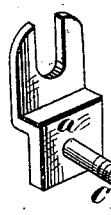
Witnesses
F. L. Durand
Robert Lynch
Inventor
Albert L. Adams
by L. Deane
Atty